June 11, 1963  F. P. VACHA  3,092,838
GLARE SHIELD
Filed Dec. 12, 1961  2 Sheets-Sheet 1
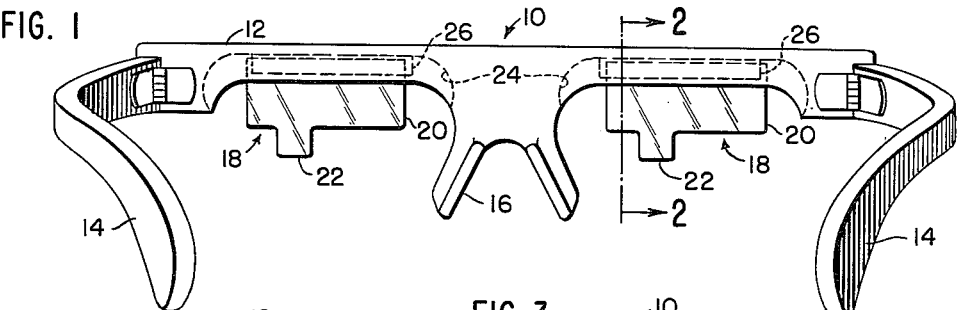
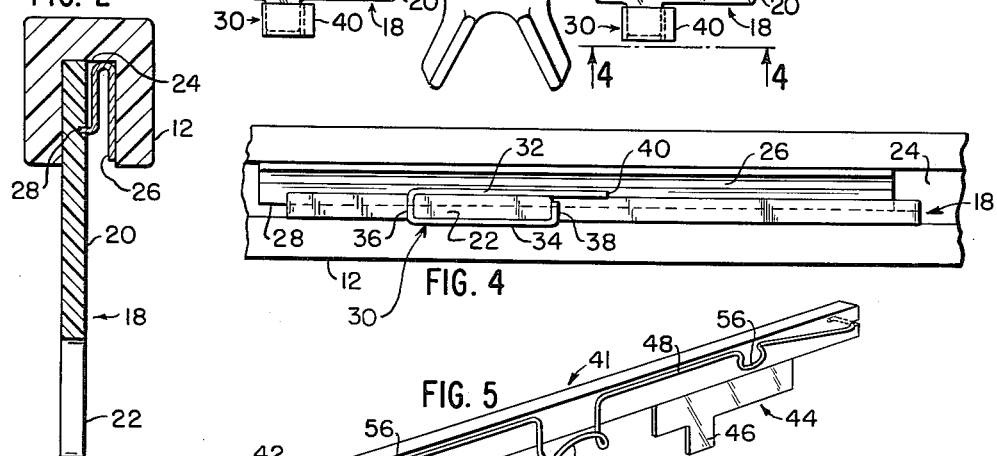
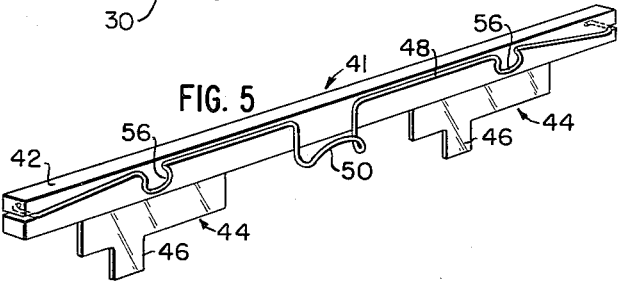
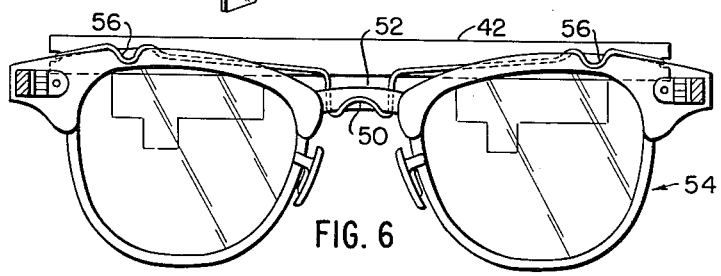
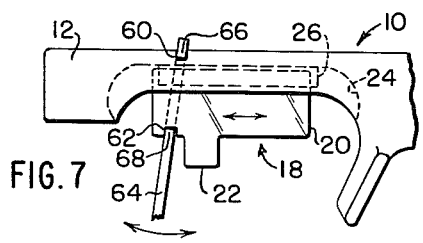
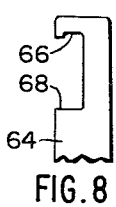
INVENTOR.
FRED P. VACHA
BY Kenway, Jenney & Hildreth
ATTORNEYS June 11, 1963  F. P. VACHA  3,092,838
GLARE SHIELD Filed Dec. 12, 1961  2 Sheets-Sheet 2

INVENTOR.
FRED P. VACHA
BY
ATTORNEYS 3,092,838
GLARE SHIELD
Fred P. Vacha, 116 Clarke Road, Needham, Mass.
Filed Dec. 12, 1961, Ser. No. 161,763
10 Claims. (Cl. 2—12)

This invention relates to a novel and improved glare shield intended principally for use by automobile drivers to reduce the glare of oncoming headlights as well as overhead lights.

The need has long been felt for a device which would protect the eyes of an automobile driver from the glare of oncoming headlights and which, at the same time, would not adversely obstruct the driver's field of vision, and particularly that portion of his field of vision on the side of the road opposite oncoming traffic. Various attempts have been made to fill this need. Most prior art devices of this type have utilized relatively wide glare reducing members mounted on a frame for support on the head of a wearer. While such prior devices may reduce the glare of oncoming headlights, they also may seriously affect the side vision of the wearer, particularly on the side of the road opposite oncoming automobiles. Also, it has been recognized that it is desirable to provide for aligning of the glare reducing members, or in other words, adjusting of the spacing thereof relative to the pupillary spacing of the wearer. However, heretofore only very rough aligning of glare shield of the type described has been possible, and the desired results have thus not been achieved.

Accordingly, it is the primary object of the present invention to provide a glare shield of novel and improved construction whereby aligning thereof is facilitated and may be obtained very accurately.

It is a further object of the present invention to provide a glare shield of novel and improved construction whereby glare reduction is provided in the field of vision in line with oncoming headlights while at the same time, the side vision of the wearer is not adversely impaired, and further, which will provide glare reduction with respect to overhead lights.

Other objects will be in part obvious and in part pointed out more in detail hereinafter.

The invention accordingly comprises provisions for accurate glare shield alignment, and the features of construction, combination of elements and arrangement of parts which will be exemplified in the construction hereafter set forth and the scope of the application of which will be indicated in the appended claims.

In the drawings:

FIG. 1 is a rear elevational view of a glare shield embodying the present invention;

FIG. 2 is an enlarged cross sectional view substantially along the line 2—2 of FIG. 1;

FIG. 3 is a fragmentary elevational view of a portion of the glare shield of FIG. 1 illustrating another aspect of the invention;

FIG. 4 is an enlarged fragmentary bottom view of the portion of the glare shield of FIG. 3 indicated at 4—4 in FIG. 3;

FIG. 5 is a perspective view of a glare reducing attachment embodying the present invention and constructed for application to eyeglasses;

FIG. 6 is a front elevational view of a pair of eyeglasses mounting the glare shield adapter of FIG. 5;

FIG. 7 is a fragmentary rear elevational view of a modified glare shield of the type shown in FIG. 1 illustrating another aspect of the invention;

FIG. 8 is a fragmentary elevational view of an aligning lever used with the glare shield of FIG. 7.

Figure 9:
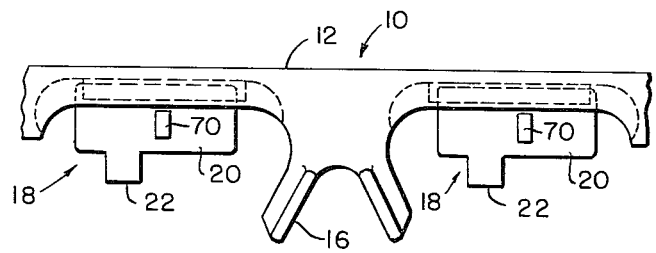
FIG. 9 is a fragmentary rear elevational view of an alternative embodiment of the invention.

With reference to the drawings, and particular FIGS. 1 to 4, a preferred embodiment of a glare shield constructed in accordance with the present invention comprises a frame 10, which is adapted to be supported on the head of a wearer. The frame 10 comprises an elongated bar 12 and a pair of bows 14 hingedly connected to the opposite ends of the bar. The bar 12 is further provided with a conventional nose bridge 16. With the frame 10 supported on the head of the wearer in the manner of conventional eyeglasses, the bar 12 will extend across the forehead of the wearer above the eye level. A pair of glare reducing members, generally indicated at 18, are adjustably supported on the frame 10 on opposite sides of the nose bridge 16. The glare reducing members 18 are fabricated from a sheet of suitable transparent glare reducing material. Each glare reducing member 18 comprises a generally rectangular upper portion 20 and a narrow tab 22 depending from the lower edge of the upper portion 20 as seen in FIG. 1, the tabs 22 are offset a substantial distance to one side of the lateral centerline of the upper portions 20 of the glare reducing members. As will be later seen, the wide upper portions 20 protects the eyes of the wearer from overhead lights while the narrow tabs 22 are utilized to protect the eyes of the wearer from the glare of oncoming headlights.

The bar 12 is provided on its underside with a pair of slots 24 disposed on opposite sides of the nose bridge 16 and extending longitudinally of the bar 12. As most clearly shown in FIG. 2, the upper edge portions of the upper portions 20 of the glare reducing members 18 are received within the slots 24 which are substantially longer than the upper portions of the glare reducing members 20. In order to support the glare reducing members 18 in the slots 24 for adjustment longitudinally thereof and to resiliently maintain the glare reducing members in adjusted position, a resilient member 26 is fixed, such as by cementing, in each of the slots 24 alongside the glare reducing member 18. As most clearly shown in FIG. 2, this resilient member 26 comprises an elongated metal member having a generally inverted U-shaped cross section. The longitudinal edge of the side of the U-shaped member 26, next adjacent the glare reducing member, is out turned to provide a lip 28 slidably engaged in a groove in the upper portion of the glare reducing member. The spring 26 has a lateral dimension in its free unstressed condition which is greater than the lateral dimension of the spring after the spring and glare reducing member are assembled in the channel 24. Accordingly, it can be seen that the spring 26 not only guides the endwise travel of the glare reducing member 18, but also, being laterally compressed, exerts a force on the glare reducing member to hold the glare reducing member against the side of the slot 24 thereby tending to maintain the glare reducing member in adjusted position longitudinally of the slot 24.

In the use of the device thus far described, the frame 10 if fitted to the head of the wearer whereupon the tab 22 will normally be slightly above the normal line of vision of the wearer. Thus, during normal driving conditions, the eyes will have an unobstructed clear view of the road ahead, as well as both sides thereof. Upon the approach of bright headlights, a slight forward tilting of the head will bring the tabs 22 into the field of vision of the wearer, thus guarding the eyes against objectionable glare, while at the same time, not affecting the side vision of the wearer. In this latter connection, the tabs 22 are quite narrow, it being preferred that they have a width on the order of ¼ inch. This contrasts very greatly with the relatively wide widths of glare reducing members heretofore used for this purpose. On the other hand, the integral upper portion 20 of the glare reducing members 18 is relatively wide and provides protection of the eyes of a wearer from the glare of fixed overhead lights.

The improved performance of the glare shield of this invention is achieved with the narrower tabs 22 by means of accurate aligning of the center of the tabs so that they are spaced apart on centers at a distance equal to the pupillary spacing of the wearer. The improved accuracy and facility of aligning of the tabs 22 is achieved by means of opaque aligning means which in the embodiment of FIG. 3 are detachable opaque aligning tabs, generally indicated at 30, in FIGS. 3 and 4. In the embodiment shown in FIGS. 3 and 4, the aligning tabs are fabricated from a strip of sheet metal. Each tab comprises a portion 32 overlying one face of the tab 22 and another portion 34 overlying the other face of the tab 22. The portions 32 and 34 are resiliently connected by a leg portion 36. The free end of the portion 34 of each aligning tab is turned inwardly toward the portion 32 to form another leg 38. As clearly shown in FIG. 4, the legs 36 and 38 are spaced apart a distance substantially corresponding to the width of the glare reducing tab 22. These portions of the aligning tab, as well as the portions 32 and 34 frictionally embrace the sides and vertical edges of the glare reducing tab 22 so as to retain the aligning tab on the glare reducing tab. The aligning tab may be easily removed or engaged with the glare reducing tab by endwise movement of the aligning tab over the glare reducing tab. In accordance with the invention, the free vertical edge 40 of the portion 32 of the aligning tab provides an aligning edge whereby each glare reducing tab 22 may be accurately located relative to the pupil of the wearer. Further, in accordance with the invention, the free end of the portion 32 of the aligning tab extends a predetermined distance beyond the glare reducing tab so that aligning edge 40 is offset a predetermined distance form the next adjacent vertical edge of the glare reducing tab in the direction of adjustment of the glare reducing member 18 within the slot 24 in the frame 10.

In aligning the device thus far described, the wearer looks straight ahead for a distance of one hundred feet or more at some vertical line, such as the corner of a room or a telephone pole, etc. With one eye closed, and while looking straight ahead, the glare reducing member registering with the open eye is adjusted longitudinally of the slot 24 until the aligning edge 40 of the aligning tab coincides with the vertical line being viewed. When correctly adjusted, a very slight turning of the head alternately, from one side to the other, will alternately cover and uncover the vertical reference line. After one side has thus been correctly adjusted, the other glare reducing member is similarly adjusted. As a final test for correct alignment, the wearer, while looking straight ahead at the vertical reference line, and without moving the head, alternately closes one eye and then the other repeatedly and quickly. When properly adjusted, the aligning edge of each aligning tab will coincide with the vertical reference line on alternate view with each eye. The aligning tabs 30 are then removed from the glare reducing tabs, whereupon the glare shield is ready for use.

The offset aligning edge 40 provides that, with the glare reducing members adjusted as described, the centers of the glare reducing tabs 22 will be offset laterally from the pupils of the wearer. With the aligning tabs assembled on the glare reducing tabs 22, as shown in FIG. 3, this offset will be to the left of the wearer. This is preferred where the glare shield is used in a country in which oncoming cars pass to the left of the driver. The offsetting of the glare reducing tabs 22 offers optimum protection from the glare of oncoming headlights as the oncoming car passes the wearer's vehicle, while at the same time, it does not interfere with forward vision or side vision to the right of the wearer. Where the glare shield is used in countries in which driving is done on the left hand side of the road, the aligning tabs should be reversed from that shown in FIG. 3 so that when the glare reducing members are properly aligned, the tabs 22 will be offset to the right of the center of vision of the wearer. It has been found that with glare reducing tabs having a width of approximately ¼ inch, it is preferred that the aligning edge 40 be offset approximately 3/32 inch from the next adjacent vertical edge of the glare reducing tab.

The glare shield of this invention is equally useful in a device adapted for snap-on mounting to existing eyeglasses. A preferred embodiment of this aspect of the invention is shown in FIGS. 5 and 6. With reference to FIG. 5, the embodiment therein shown comprises a frame 41 including a bar 42 mounting glare reducing members 44 similar to the glare reducing members 18 previously described. The glare reducing members 44 are mounted in the manner described as in connection with the bar 12 so as to be adjustable longitudinally of the bar 42. It will be understood that the detachable aligning tab will be provided within the embodiment of FIG. 5 and that the alignment of the glare reducing tabs 46 of the embodiment of FIG. 5 will be accomplished in the same manner previously described in connection with the embodiment of FIGS. 1 to 4. The frame 41 of the snap-on device of FIGS. 5 and 6 is provided with a resilient wire retaining member 48 connected at its opposite ends, respectively, with the opposite ends of the bar 42. The retainer 48 is provided at its center with a hook portion 50 which, as shown in FIG. 6, is engageable with the underside of the nose bridge 52 of a conventional pair of eyeglasses 54. The wire 48 is further provided on opposite sides of the hook portion 50 with a pair of smaller hook portions 56. The smaller hook portions 56 face generally oppositely the center hook portion 50 and are engageable over the tops of the rims of the eyeglasses 54. The hooks 56 are then disposed on opposite sides of the eyeglass frame from the hook 50, and the frame 41 is securely attached to the eyeglasses 54. The bar 42 may, however, be readily detached from the eyeglasses 54 merely by unsnapping the hooks 50 and 56 from the eyeglass frame.

With reference to FIGS. 7 and 8, there is shown a modification of the embodiment of FIGS. 1 to 4 which facilitates adjustment of the glare reducing member 18. While this modification will be described in terms of the embodiments of FIGS. 1 to 4, it will be understood that it is equally applicable to other embodiments of the invention. Further, in the interest of brevity, only one-half of the frame 10 is shown, it being understood that the modification applies also to the other half of the frame. As shown in FIG. 7, the bar 12 of the frame 10 is provided with a notch or recess 60 in its upper edge. The notch 60 is offset toward the end of the bar 12 from the midpoint of the slot 24. The glare reducing member 18 is also provided with a notch or recess 62 in the bottom edge of the upper portion 20 approximately below the notch 60 in the bar 12. In accordance with the invention, a lever 64 is provided for effecting adjustment of each glare reducing member 18 during aligning thereof. The lever 64 is provided with a pair of shoulders 66 and 68 spaced apart longitudinally of the lever and loosely receivable in the notches 60 and 62. In the preferred embodiment, the lever 64 is a pressed metal stamping with the shoulders 66 and 68 facing in opposite directions longitudinally of the stamping. With the shoulder 66 fulcrumed in the notch 60 of the frame and the shoulder 68 received in the notch 62, a pivoting of the lever in a direction parallel to the general plane of the glare reducing member 18 will effect adjustment of the glare reducing member longitudinally of the slot 24. By the use of the aligning lever 64, a very fine alignment may be achieved. The aligning lever 64 may be particularly advantageous in the case of the snap-on mounting devices of FIGS. 5 and 6 where, because of the lenses of the eyeglasses 54, it may be difficult to grasp the glare reducing members 18 for adjustment.

With reference to FIG. 9, there is disclosed a further preferred embodiment of this invention. The embodiment of FIG. 9 is generally similar to the embodiment of FIG. 1 in that it comprises a frame 10 including a bar 12 and nose bridge 16. The glare reducing members 18 are similar to those of FIG. 1 having generally rectangular upper portions 20 with depending narrow glare reducing tabs 22. The glare reducing members 18 are adjustably mounted on the frame 10 in the same manner as described in connection with FIGS. 1 to 4. However, in the embodiment of FIG. 9, the alignment of the glare reducing tabs is achieved through the use of fixed index markers 70 on the upper wide portions 20 of the glare reducing members 18. These index markers 70 are opaque portions on the glare reducing members and may be provided in any suitable manner such as by printing the members 70 or by fabricating them separately from the glare reducing members and adhering them thereto by pressure sensitive adhesive or the like.

As can be seen from FIG. 9, the index markers are narrower than the tabs 22 and are spaced laterally from the glare reducing tabs 22 in a rightward direction, as viewed by a wearer. For driving in this country this corresponds to the object of offsetting the glare reducing tabs toward the lane of traffic approaching a driver wearing the glare shield. While it is preferred to keep the index markers narrow, it has been found that they should be approximately 1/8" in width, preferably not narrower than 3/32", so that they will be sufficiently visible to provide accurate alignment of the tabs 22.

When the glare shield is worn, the index markers on the upper wide portions 20 of the glare reducing members, will not be apparent to the wearer. The location of the index markers, their narrowness and proximity to the eye of the wearer results in their being generally out of focus and unobservable by the wearer except during use of the markers to align the glare reducing tab 22. In this connection, when it is desired to align the tabs 22, one eye is closed and the member 22 opposite the open eye is adjusted so that its index marker lines up with a vertical reference point such as a telephone pole, preferably distant by a hundred feet or more. Subsequently, the other member 18 is aligned in the same manner. While the embodiment of FIG. 9 has been described in connection with the structure similar to the embodiment of FIG. 1, it will also be apparent that this aspect of the invention is fully useful in connection with the glare shield of the type shown in FIGS. 5 and 6.

From the above, it can be seen that there is provided a novel and improved glare shield, the narrow glare reducing tabs of which provide a shielding from the glare of oncoming headlights without impairing vision adjacent to such oncoming headlights. The opaque aligning means of this invention provides the desired amount of offset of the tabs so that oncoming glare is effectively subdued, while a clear view is maintained in the driver's lane. The narrow glare reducing tabs 22 provide a narrow path of glare reduction to the left of the road center when the head of the wearer is tilted only slightly forward so that only the desired portion of the field of vision is shielded. Clear vision is otherwise maintained to either side as well as the front of the wearer, thereby avoiding undesired and dangerous blind spots. Even on curving highways, the eyes can be effectively shielded from oncoming headlights by a combination of a slight forward tilting and turning of the head of the wearer; thus, the eyes at all times will be guarded from dangerous eye fatigue regardless of whether oncoming headlights are on low beam or high beam.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

This application is a continuation-in-part of my copending application Serial No. 64,848 filed October 25, 1960, now abandoned.

Having described my invention, I claim:

1. A glare shield of the type described, comprising a frame for support on the head of a wearer, a pair of transparent narrow glare reducing tabs supported on the frame for selective individual adjustment in a direction extending across the eyes of a wearer to match the spacing of the tabs to the pupillary distance of the wearer, and a pair of opaque aligning members respectively associated with said glare reducing tabs, each of said opaque members providing a vertical aligning index marker for registry with a vertical reference line during alignment of the glare reducing tabs.

2. A glare shield of the type described, comprising a frame for support on the head of a wearer, a pair of transparent narrow glare reducing tabs supported on the frame for selective individual adjustment in a direction extending across the eyes of a wearer to match the spacing of the tabs to the pupillary distance of the wearer, and a pair of opaque aligning members respectively associated with said glare reducing tabs and each having at least a portion thereof offset laterally of the respectively associated glare reducing tab in the direction of adjustment of the glare reducing tab.

3. A glare shield of the type described, comprising a frame for support on the head of a wearer, a pair of transparent narrow glare reducing tabs supported on the frame for selective individual adjustment in a direction extending across the eyes of a wearer to match the spacing of the tabs to the pupillary distance of the wearer, and a pair of detachable opaque aligning tabs respectively covering said glare reducing tabs, each of said aligning tabs having a vertical edge for alignment with a vertical reference line during aligning of the glare reducing tabs.

4. A glare shield of the type described, comprising a frame for support on the head of a wearer, a pair of transparent glare reducing members each comprising a relatively wide upper portion and a relatively narrow tab depending from said upper portion, means mounting the glare reducing members for selective adjustment in opposite directions across the eyes of a wearer, the tabs being offset from the centers of said upper portions of the glare reducing members in one direction of adjustment thereof, and a pair of detachable opaque aligning tabs respectively covering said glare reducing tabs, each of said opaque tabs having a vertical aligning edge spaced laterally from the respectively associated glare reducing tab.

5. A glare shield of the type described, comprising a frame for support on the head of a wearer, a pair of transparent narrow glare reducing tabs supported on the frame for selective individual adjustment in a direction extending across the eyes of a wearer to match the spacing of the tabs to the pupillary distance of the wearer, each glare reducing tab having a front and a rear face and a pair of vertical edges, a detachable aligning tab slidably engaged over each glare reducing tab and including an opaque portion covering one face of the glare reducing tabs and extending a predetermined distance beyond one vertical edge thereof in the direction of adjustment of the glare reducing tabs, an integral rear portion on each aligning tab extending over the other face of the glare reducing tab, each aligning tab having a leg joining said front and rear portions, said rear portion terminating in a second leg extending toward said front portion, the front and rear portions and legs of each aligning tab being closely fitted over the corresponding portions of the respective glare reducing tabs so that the aligning tab firmly embraces the glare reducing tab along both its faces and vertical edges.

6. A glare shield of the type described, comprising a frame for support on the head of a wearer, a pair of transparent glare reducing members each comprising a relatively wide upper portion and a relatively narrow tab depending from said upper portion, means mounting the glare reducing members for selective adjustment in opposite directions across the eyes of a wearer, the tabs being offset from the centers of said upper portions of the glare reducing members in one direction of adjustment thereof, a pair of opaque alignment index markers on the pair of glare reducing members respectively, said markers being fixed to said upper portions of the glare reducing members and being spaced in the same direction laterally from the respectively associated depending tabs.

7. A glare shield of the type described, comprising a frame for support on the head of a wearer, a pair of transparent glare reducing members each comprising a relatively wide upper portion and a relatively narrow tab depending from said upper portion, means mounting the glare reducing members for selective adjustment in opposite directions across the eyes of a wearer, the tabs being offset from the centers of said upper portions of the glare reducing members in one direction of adjustment thereof, a pair of opaque alignment index markers on the pair of glare reducing members respectively, said markers being fixed to said upper portions of the glare reducing members and being spaced in the same direction laterally from the respectively associated depending tabs, said index markers being at least approximately $3/32''$ in width, said tabs being approximately $1/4''$ in width.

8. A glare shield of the type described, comprising a frame for support on the head of a wearer, a pair of transparent glare reducing members each comprising a relatively wide upper portion and a relatively narrow tab depending from said upper portion, means supporting each of said glare reducing members on the frame for selective individual adjustment in a direction extending across the eyes of a wearer to match the spacing of the tabs to the pupillary distance of the wearer, the supporting means including a resilient member slidably guiding the glare reducing member and frictionally tending to maintain the same in selectively adjusted position, and a pair of opaque aligning members on said pair of glare reducing members and each having a vertical edge spaced laterally of and from a next adjacent edge of the glare reducing tabs.

9. A glare shield of the type described, comprising a frame for support on the head of a wearer, a pair of transparent glare reducing members each comprising a relatively wide upper portion and a relatively narrow tab depending from said upper portion, and means supporting each of said glare reducing members on the frame for selective individual adjustment in a direction extending across the eyes of a wearer to match the spacing of the tabs to the pupillary distance of the wearer, the supporting means including a slot in the frame extending in the direction of adjustment of said glare reducing members and an elongated resilient member fixed in said slot and extending longitudinally thereof, said resilient member having a U-shaped cross section, one of the longitudinal edges of said resilient member being turned outwardly to provide a lip engaging slidably in a channel in the upper portion of said glare reducing member.

10. A glare shield of the type described, comprising a frame for support on the head of a wearer, a pair of transparent glare reducing members each comprising a relatively wide upper portion and a relatively narrow tab depending from said upper portion, means supporting each of said glare reducing members on the frame for selective individual adjustment in a direction extending across the eyes of a wearer to match the spacing of the tabs to the pupillary distance of the wearer, the supporting means including a slot in the frame extending in the direction of adjustment of said glare reducing members and an elongated resilient member fixed in said slot and having a lip extending at right angles to the general plane of said slot, the upper edge portion of each glare reducing member being received in the slot in the frame alongside the resilient member and having a slot in which said lip is resiliently engaged, and means for selectively adjusting said glare reducing members including a lever having a pair of oppositely facing shoulders spaced apart longitudinally of the lever, said frame provided with a pair of recesses respectively associated with said pair of glare reducing members, each glare reducing member having a recess, the shoulders on said lever being receivable simultaneously in one of the recesses in the frame and the recess in the associated glare reducing member so that upon pivoting of the lever about the recess in the frame the glare reducing member will be moved relative to the frame.

References Cited in the file of this patent

UNITED STATES PATENTS

| | | |
|---|---|---|
| 1,495,828 | Weller | May 27, 1924 |
| 1,742,049 | Rollins | Dec. 31, 1929 |
| 1,744,282 | Rollins et al. | Jan. 21, 1930 |
| 2,601,084 | Brown et al. | June 17, 1952 |
| 2,639,429 | Lundberg | May 26, 1953 |
| 2,743,447 | Young | May 1, 1956 |